(12) United States Patent
Fries et al.

(10) Patent No.: US 8,560,844 B2
(45) Date of Patent: Oct. 15, 2013

(54) METHOD AND TRANSMITTING DEVICE FOR SECURELY CREATING AND SENDING AN ELECTRONIC MESSAGE AND METHOD AND RECEIVING DEVICE FOR SECURELY RECEIVING AND PROCESSING AN ELECTRONIC MESSAGE

(75) Inventors: Steffen Fries, Baldham (DE); Eric Scheer, München (DE)

(73) Assignee: Siemens Aktiengesellschaft, Munich (DE)

( * ) Notice: Subject to any disclaimer, the term of this patent is extended or adjusted under 35 U.S.C. 154(b) by 433 days.

(21) Appl. No.: 12/446,400

(22) PCT Filed: Oct. 9, 2007

(86) PCT No.: PCT/EP2007/060701
§ 371 (c)(1), (2), (4) Date: Apr. 20, 2009

(87) PCT Pub. No.: WO2008/046764
PCT Pub. Date: Apr. 24, 2008

(65) Prior Publication Data
US 2010/0325414 A1    Dec. 23, 2010

(30) Foreign Application Priority Data
Oct. 20, 2006 (DE) .................. 10 2006 049 646

(51) Int. Cl.
*H04L 29/06* (2006.01)
(52) U.S. Cl.
USPC ........... 713/164; 713/150; 713/152; 713/194; 709/206; 709/213; 709/215
(58) Field of Classification Search
None
See application file for complete search history.

(56) References Cited

U.S. PATENT DOCUMENTS 6,647,409 B1   11/2003   Sherman et al.
7,464,412 B2   12/2008   Avraham et al.
(Continued)

FOREIGN PATENT DOCUMENTS

EP    1 526 426    4/2005
EP    1 674 965    6/2006
(Continued)

OTHER PUBLICATIONS

BoBo, Sampling Sound in Windows 32 [C++], Nov. 30, 2005, AutoHotKey Community, p. 1, retrieved from http://www.autohotkey.com/community/viewtopic.php?t=6654.*

(Continued)

*Primary Examiner* — Kaveh Abrishamkar
*Assistant Examiner* — Adrian Stoica
(74) *Attorney, Agent, or Firm* — Staas & Halsey LLP

(57) ABSTRACT

The subject matter relates to a method for securely creating and sending an electronic message, whereby the message is created using a first application running in a secure operating system, the created message is stored in a storage that can only be accessed by the secure operating system and a virtualizing unit. In a second application executed by the virtualizing unit, the internal storage is analyzed for the presence of a message and, if the message is present, the message is transmitted to a receiver. The subject matter also relates to a method for securely receiving and processing an electronic message, whereby an external storage is analyzed for the presence of a message using a second application and, if the message is present, the message is transmitted to the internal storage. The presence of the message is polled using the first application and, if the message is present, the message is transmitted from the internal storage to the first application for processing. The subject matter further relates to a transmitting device for carrying out the method for securely creating and sending the electronic message and a receiving device for carrying out the method for securely receiving and processing the electronic message.

8 Claims, 2 Drawing Sheets

(56) References Cited

U.S. PATENT DOCUMENTS

| | | |
|---|---|---|
| 2002/0124052 A1* | 9/2002 | Brown et al. ............... 709/206 |
| 2004/0153672 A1* | 8/2004 | Watt et al. .................. 713/201 |
| 2005/0114870 A1 | 5/2005 | Chun et al. |
| 2005/0138353 A1* | 6/2005 | Spies et al. ................. 713/153 |
| 2005/0182964 A1 | 8/2005 | Jooste et al. |
| 2005/0267738 A1 | 12/2005 | Marshall et al. |
| 2006/0053202 A1* | 3/2006 | Foo et al. ................... 709/206 |
| 2006/0200660 A1* | 9/2006 | Woods ........................ 713/155 |
| 2006/0236127 A1* | 10/2006 | Kurien et al. ............... 713/193 |
| 2007/0011272 A1* | 1/2007 | Bakke et al. ................ 709/217 |
| 2007/0028244 A1* | 2/2007 | Landis et al. ............... 718/108 |
| 2007/0079120 A1* | 4/2007 | Bade et al. .................. 713/166 |
| 2007/0118874 A1* | 5/2007 | Adams et al. ................... 726/1 |
| 2007/0198853 A1* | 8/2007 | Rees ............................ 713/189 |
| 2009/0083862 A1 | 3/2009 | Avraham et al. |
| 2010/0134924 A1 | 6/2010 | Nagata |

FOREIGN PATENT DOCUMENTS

| | | |
|---|---|---|
| JP | 2005/129035 | 5/2005 |
| JP | 2009/526284 | 7/2009 |

OTHER PUBLICATIONS

VM Ware Server (www.vmware.com); Free Virualization for Windows and Linux Servers; 2006.

XEN (www.xensource.org); XenEnterprise: Datasheet; 2006.

Virtual Workstation (Secunet, www.secunet.com); Die SINA Virtual Workstation 2.0; 2006.

Twinsafe (CE Infosys, www.ce-infosys.com) CE-Infosys GmbH; 2006.

"Electronic Mail Security" Cryprography and Network Security: Principles and Practice, 1999, Seiten 355-397, XPOO2212123 chapter 12.2.

* cited by examiner

METHOD AND TRANSMITTING DEVICE FOR SECURELY CREATING AND SENDING AN ELECTRONIC MESSAGE AND METHOD AND RECEIVING DEVICE FOR SECURELY RECEIVING AND PROCESSING AN ELECTRONIC MESSAGE

CROSS REFERENCE TO RELATED APPLICATIONS

This application is a U.S. National Stage of International Application No. PCT/EP2007/060701, filed Oct. 10, 2007 and claims the benefit thereof. The International Application claims the benefits of German Application No. 10 2006 049 646.9, filed on Oct. 20, 2006, both applications are incorporated by reference herein in their entirety.

BACKGROUND

1. Field

The embodiments discussed herein relate to a method and a transmitting device for securely creating and sending an electronic message, and to a method and a receiving device for securely receiving and processing an electronic message.

2. Description of the Related Art

As a result of modern communication confidential data, which is of fundamental value to a company, is processed on the basis of computers. This confidential data is often stored on portable computers, such as laptops or PDAs (Personal Digital Assistant).

To prevent third parties accessing confidential data, the data is stored in encrypted form using, for example, a CryptoEx Security Software program from the PGP Corporation. Confidential data can be sent in emails by means of suitable encryption in this connection.

However, these software programs do not meet the requirements for securely storing data, for example for military applications, on a terminal. By way of example, potential dangers in undesirable software programs, such as viruses or Trojan horses, or in the operating system itself, are seen in the military application environment. In the case of an operating system a user cannot assume that there are no secret means of access by the manufacturer of the operating system to data in the operating system with which confidential data may be tapped, for example when read by a user.

One approach to solving this requirement can be achieved by using completely separate systems. In this case physically separate systems are used in which data is exchanged manually. This is not particularly viable in practice as the separate systems mean that administrative expenditure for management and infrastructure costs are considerable. A further approach is encapsulation of the operating system in order to better be able to control communication from or to the operating system. This can take place by way of a virtualization layer.

A virtualization layer allows virtual containers in which operating systems can be independently executed. In this case the virtualization layer defines an abstraction of the hardware with regard to the respective virtual containers. The following methods/products are known in this connection:

VM Ware Server (www.vmware.com): this product allows inter alia use of virtual containers in which the user's own operating systems run. However it does not control access to hardware resources, such as graphics storage devices.

XEN (www.xensource.org): a virtualization layer is defined in this open source project which provides abstraction of the hardware with respect to the actual operating system with which the user is working.

Twinsafe (CE Infosys, www.ce-infosys.com): this product provides the possibility of keeping the virtual container data strictly separate from each other. However, to change over from one container to another the operating system running in, the previous container has to be ended and the operating system to be started in the other container booted. Rapid changeover between the containers, i.e. between the operating systems, is not possible in this case.

Virtual Workstation (Secunet, www.wecunet.com): this product provides virtual containers, a key for managing container-related data being associated with each container.

These products allow the security when operating one or more operating system(s) with confidential data to be improved. However, the methods/products have drawbacks which an attacker can use to tap confidential data. In the case of electronic messages in particular, when creating or reading and when sending or receiving these electronic messages, there is the potential risk that the attacker can feed in malicious software, such as worms or Trojans, and/or outwardly transmit confidential data via communication paths and communication protocols, such as LAN (Local Area Network) or an email protocol SMTP (Simple Mail Transfer Protocol).

An aspect of the embodiments is therefore to disclose methods and devices for securely creating, sending, receiving and processing an electronic message which, compared with the prior art, increase security against malware, such as worms, Trojans and viruses.

SUMMARY

The subject matter relates to a method for securely creating and sending an electronic message, in which the following steps are run through:

executing a first application in a secure operating system to create the electronic message, the secure operating system being executed in a virtualization unit container, storing the electronic message on an internal storage which can only be accessed by the secure operating system and the virtualization unit, polling of the internal storage by a second application for the presence of the electronic message, the second application being executed by the virtualization unit, transmitting the electronic message to the second application if the electronic message is present, sending the electronic message by the second application to a receiver of the electronic message.

With the aid of this method, in addition to an operating system for executing any desired applications, a user can allow a secure operating system to run in a system, for example a laptop, in which a strict separation of information generation, i.e. creation of the electronic message, and sending of this electronic message, can separate and monitor the communications path used. On the one hand this makes it possible, during creation of the electronic message, to prevent content of this electronic message from being snooped on, and, during transmission of this electronic message to the second application, tapping of the electronic message by an attacker is virtually ruled out. Furthermore, separate creation and sending of the electronic message transparently reveals tracking of the transmission method used, which could be manipulated in an open operating system, such as Windows XP. The approach also has the advantage that no standardized transmission method is used for sending the electronic message, and this virtually rules out manipulation due to malware, such as worms or Trojans, because current malware modules recognize standardized transmission methods, such as a standardized interface for sending and/or receiving electronic messages, such as POP3 (Post Office Box 3), and can manipulate them.

The electronic message is preferably encrypted before sending, using a key that is associated with the receiver, making an attack on the electronic message more difficult. A control field and a text field of the electronic messages can moreover be stored separately from each other on the internal storage device, be polled by the second application solely for the presence of the control field of the electronic message, and a key associated with the receiver of the electronic message be determined by the second application using the control field. This expansion simplifies the method as only the control field has to be evaluated to determine the key associated with a specific receiver. This also has the advantage that a data set to be transmitted is reduced and an attack on the text field containing important information is reduced.

The subject matter also relates to a method for securely receiving and processing an electronic message, which carries out the following steps:

executing a first application in a secure operating system to process the message, the secure operating system running in a virtualization unit container, polling of an external storage by a second application for the presence of the electronic message, the second application being executed by the virtualization unit (VS), transmitting the electronic message, if present, from the external storage to an internal storage, which can only be accessed by the secure operating system and the virtualization unit, via the second application, polling of the internal storage by the first application for the presence of the electronic message, transmitting the electronic message from the internal storage to the first application by the first application for processing the electronic message if the electronic message is present on the internal storage.

Even electronic messages can be received and processed securely using the method for securely receiving and processing the electronic message. The strict separation of receiving and processing of the electronic message in particular means manipulation of and/or unauthorized access to the content of the electronic message is made much more difficult. This access is also made difficult by the fact that the communication paths from receipt through to delivery of the electronic message in a terminal are clearly defined with respect to the first application and are therefore traceable. It is precisely in current operating systems that this strict separation between receiving and processing and the traceability of the communication paths of the electronic message is difficult to control. This drawback is remedied by the method for securely receiving and processing the electronic message.

In a development the external storage are polled by the second application for the presence of an encrypted electronic message, the encrypted electronic message is decrypted into the electronic message by the second application and the electronic message transmitted to the internal storage. Using the encrypted electronic message increases security, making an attack much more difficult. If the electronic message is stored in an organized manner directly on the internal storage, without storage on the external storage device, then security is increased further because only the virtualization unit and the secure operating system have access to the internal storage device.

The subject matter also includes a transmitting device for securely creating and sending an electronic message, which is suitable for carrying out the method for securely creating and sending, wherein the transmitting device includes an arrangement or unit which is capable of executing a first application for creating the message and storing the electronic message on an internal storage and a second application for polling the internal storage for the presence of the electronic message, for transmitting the electronic message to the second application if the electronic message is present, and for sending the electronic message to a receiver of the electronic message, includes a virtualization unit, it being possible to execute the first application in a secure operating system and the secure operating system in a virtualization unit container and the second application via the virtualization unit, includes the internal storage which can only be accessed by the secure operating system and the virtualization unit.

The method for securely creating and sending the electronic message can be executed using the transmitting device.

Finally a receiving device for securely receiving and processing the electronic message forms part of the subject matter, this receiving device being capable of carrying out the method for securely receiving and processing the electronic message, wherein the receiving device includes an arrangement or unit which is capable of executing a first application for processing the message, for polling an internal storage for the presence of the electronic message, and for transmitting the electronic message from the internal storage to the first application for processing the electronic message if the electronic message is present on the internal storage, and a second application for polling an external storage for the presence of the electronic message and for transmitting the electronic message, if present, from the external storage to the internal storage via the second application, includes the virtualization unit, it being possible to execute the first application in a secure operating system and the secure operating system in a virtualization unit container and the second application via the virtualization unit, includes the internal storage which can only be accessed by the secure operating system and the virtualization unit, includes the external storage which receives at least one message to be delivered to the first application.

Within the scope of this subject matter the terms "for securely receiving and processing" and "for securely creating and sending the electronic message" are taken to mean that, during creating and sending or receiving and processing of the electronic message, the methods make manipulation by malware, such as Trojans or worms, much more difficult. Moreover, within the scope of this subject matter the external storage is taken to mean a storage device which can be written to with an electronic message, or read, by the virtualization unit and an additional unit, such as a communication server or a sender. This external storage device can also be configured in such a way that the additional unit can only write to and the virtualization unit only read from the external memory. The electronic message is taken to mean any type of message, such as text, image, music or control information, which can be electronically transmitted in each case. Furthermore, the virtualization unit is taken to mean a unit which implements operating systems separately from each other, for example in containers, and regulates access rights to hardware and/or software components, such as access to certain partitions of a hard disk drive or external interfaces. A secure operating system should be taken to mean an operating system which is executed in a virtualization unit container and which has limited access rights to hardware and/or software interfaces. A secure operating system of this kind can include Linux, MAC-OS, or a Microsoft operating system. The methods and the transmitting and receiving devices can be implemented and executed on a computer, for example a laptop or an immobile computer. Furthermore, the methods can be implemented in the form of a computer program product, it being possible to execute the computer program product on the computer.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
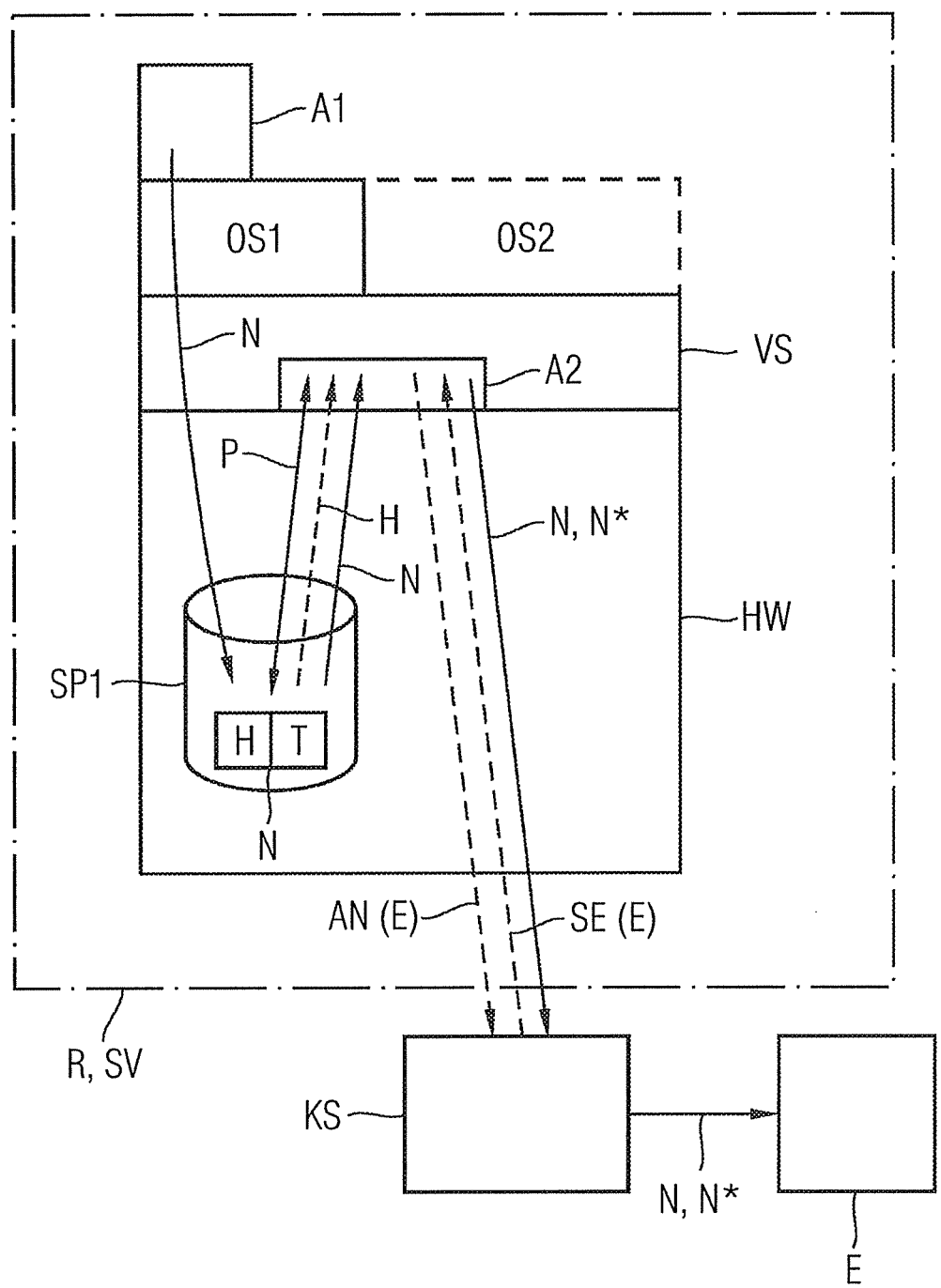
FIG. 1 shows a transmitting device for securely creating and sending an electronic message.

Reference will now be made in detail to the embodiments, examples of which are illustrated in the accompanying drawings, wherein like reference numerals refer to like elements throughout.

For executing the method for securely creating and sending an electronic message N, a commercially available laptop R is firstly fitted with a virtualization unit VS (see FIG. 1). As already described, the virtualization unit allows encapsulation of a plurality of operating systems OS1, OS2, executed in a respective container, and awarding of access rights to common hardware HW, such as a fixed disk drive or laptop interfaces, such as a USB port (Universal Serial Bus), or a LAN interface (Local Area Network), such as Ethernet.

To carry out the method, a secure operating system OS1 is executed in one of the virtualization unit containers. The secure operating system is characterized in that access to external interfaces, such as the USB or LAN interface, is blocked. The secure operating system can also only access hard disk drive partitions that are directly associated with it, or separately allocated hard disk drives. Furthermore, in an alternative development, data can be stored in encrypted form on the partition associated with the secure operating system, a virtualization unit driver providing the secure operating system with this data in unencrypted form or carrying out an encryption when storing data. The secure operating system can, for example, be Windows XP® from the Microsoft Corporation.

A user can create the electronic message using a first application A1, which is executed by the secure operating system OS1. In this case the electronic message includes a control field H, in which administrative data, such as a receiver address or a sender address is summarized, and a text field, in which the message text is entered. The electronic message can also include additional fields, such as one or more attachment(s).

Once the electronic message has been composed it is stored in an internal storage SP1 in the form of one or more separate file(s), a first file for example including the control field H and a second file including the text field T. The internal storage SP1 is constructed as a partition inside the hard disk drive of the laptop R, the virtualization unit VS allowing access, i.e. reading or writing, only by the secure operating system OS1 and the virtualization unit VS.

A second application A2, which is executed by the virtualization unit VS, polls the internal storage for the presence of the electronic message, in particular the first file including the control field H. Polling takes place either at regular or irregular intervals, for example every 10 seconds. Polling is shown symbolically in FIG. 1 by the double arrow with reference character P.

Once the second application A2 has detected that a new electronic message is available on the internal storage, the electronic message N is read by the second application A2 and forwarded to a communication server KS which is constructed for transmitting electronic messages to the receiver E. The communication server is configured as an email server, for example.

In an alternative development of the method for securely creating and sending the electronic message, the electronic message N is encrypted before sending. Additional method operations for this alternative development are shown in FIG. 1 by the broken lines. To carry out the development, the second application, after detecting the presence of the electronic message on the internal storage, first of all requests the control field H. Identification of the receiver E is extracted in the control field H. Using an inquiry message AN the communication server KS then requests that the key SE associated with the receiver E be provided. In this development the communication server operates as an email server and manages receiver keys. Once the requested key SE of the receiver E has been delivered by the communication server KS to the second application A2, the electronic message is read by the internal storage via the second application, encrypted into an encrypted electronic message N* using the key SE and the encrypted electronic message N* is delivered via the communication server KS to the receiver.

Figure 2:
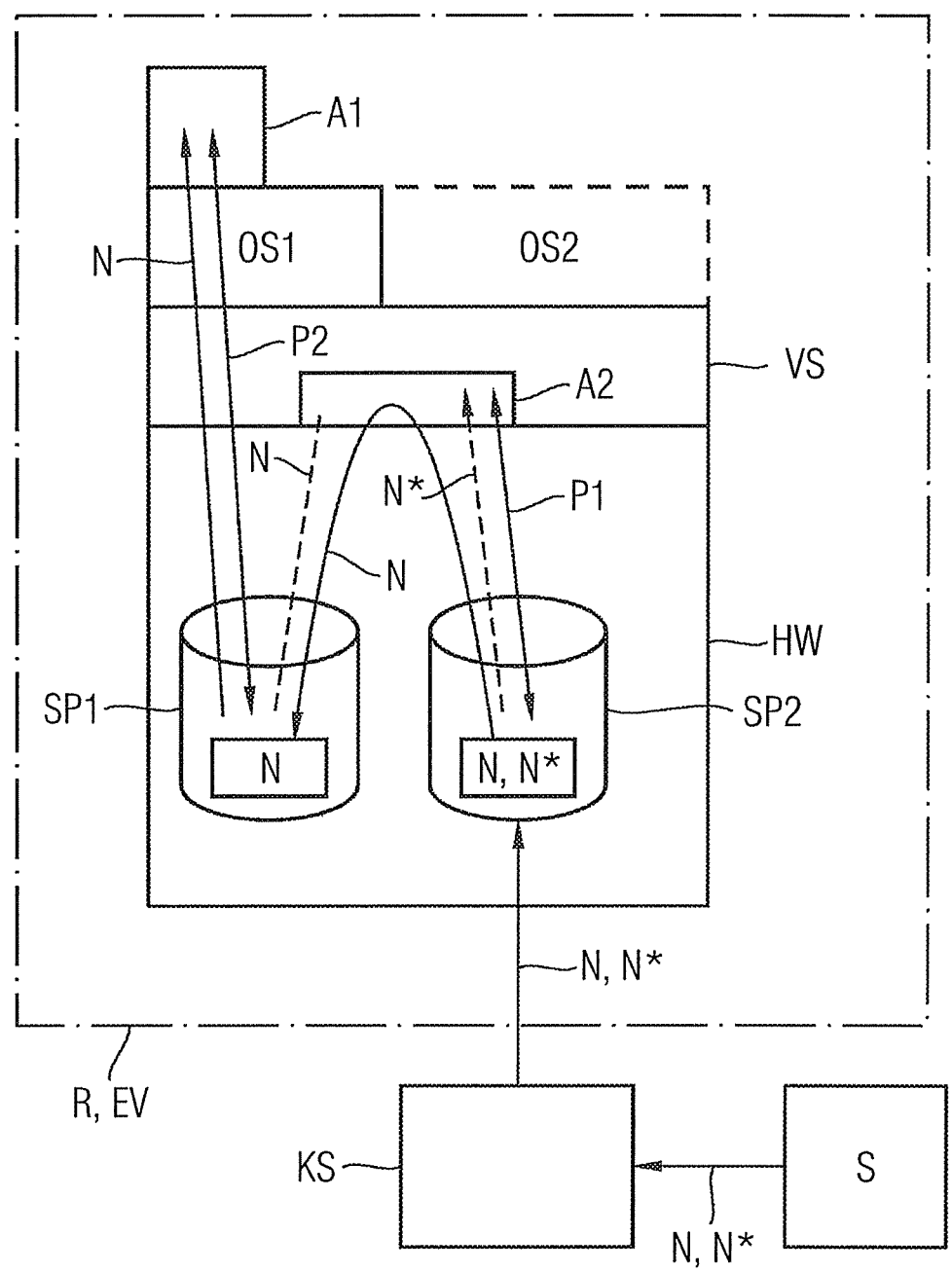
FIG. 2 shows a receiving device for securely receiving and processing the electronic message.

The method for securely receiving and processing the electronic message will be described in more detail with reference to FIG. 2. Additional method operations for this alternative development are shown in FIG. 2 by broken lines. Analogously to the statements according to FIG. 1, the laptop R includes the common hardware HW, the virtualization unit VS and at least the secure operating system OS1. The message from a sender S is stored via the communication server KS in the external storage SP2. Within the scope of this embodiment the external storage SP2 is taken to mean a storage device which can be written to by the virtualization unit and an additional unit, such as the communication server KS or the sender S, with an electronic message. In the present embodiment the external storage device is shown in graphics as part of the laptop R. In general the external storage SP2 can also be implemented as a storage device directly connected to the laptop or a storage device connected via a network.

The second application, which is executed by the virtualization unit, polls the external storage for the presence of a newly arrived electronic message. This is shown in FIG. 2 by a double arrow with reference character P1. The second application can carry out polling at regular or irregular intervals. In a subsequent step the second application A2 transmits the electronic message N from the external to the internal storage. Furthermore, the first application A1, which is executed by the secure operating system, polls the internal storage device for the presence of at least one newly arrived electronic message at regular or irregular intervals. Once this newly arrived message N has been detected the first application transmits the electronic message from the internal storage SP1 to the first application A1 for processing. By way of example, the first application processes the received electronic message in such a way that it is reproduced for a user in formatted form on the laptop R screen.

In an alternative development of the embodiment described in FIG. 2 the encrypted electronic message N*, instead of message N, is stored in the external storage SP2 by the sender S, via the communication server KS. Subsequently, and as a result of polling, see reference character P1, the second application detects that a newly transmitted encrypted electronic message N* is present in the external storage SP2. The encrypted electronic message N* is read by the second application and a decryption carried out. The decrypted electronic message N is then written directly into the internal storage SP1, without buffering on the external storage SP2. Analogously to the previous statements with reference to FIG. 2, the first application A1 polls the storage SP1 for the presence of the electronic message N, wherein, after detecting the electronic message N, it is loaded by the first application into the first application for processing.

As stated in more detail previously, various products/methods, such as VM-Ware servers, XEN, Twinsafe or Virtual Workstation, are known to a person skilled in the art with which the virtualization unit can be implemented according to FIGS. 1 and 2.

The method for securely creating and sending the electronic message can be implemented and achieved by a transmitting device SV. The transmitting device includes the following:

a first application for creating the message, the first application being executed in a secure operating system and the secure operating system being executed in a virtualization unit container, and for storing the electronic message on an internal storage which can only be accessed by the secure operating system and the virtualization unit, second application for polling the internal storage for the presence of the electronic message, the second application being executed by the virtualization unit, for transmitting the electronic message to the second application, if the electronic message is present, and for sending the electronic message to a receiver of the electronic message.

Furthermore, the method for securely receiving and processing the electronic message can be implemented and achieved using a receiving device EV. The receiving device has the following:

a first application for processing the message, the first application being executed in a secure operating system and the secure operating system being executed in a virtualization unit container, for polling an internal storage, which can only be accessed by the secure operating system and the virtualization unit, for the presence of the electronic message, and for transmitting the electronic message from the internal storage to the first application to process the electronic message if the electronic message is present on the internal storage, a second application for polling an external storage for the presence of the electronic message, the second application being executed by the virtualization unit, and for transmitting the electronic message, if it is present, from the external storage to the internal storage via the second application.

The transmitting device and/or receiving device can be implemented and operated by hardware, software or a combination of hardware and software. The receiving device and/or the transmitting device can be implemented in a portable terminal, such as a laptop, PDA (Personal Digital Assistant) or cellphone to the GSM standard (Global System for Mobile Communications), or a non-portable device, such as an office computer.

The system also includes permanent or removable storage, such as magnetic and optical discs, RAM, ROM, etc. on which the process and data structures can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for securely creating and sending an electronic message, comprising:
   executing a first application in a secure operating system to create the electronic message, the secure operating system being executed in a virtualization unit container;
   storing the electronic message on an internal storage which can only be accessed by the secure operating system and the virtualization unit;
   polling only a control field of the message of the internal storage by a second application for the presence of the electronic message, the second application being executed by the virtualization unit;
   transmitting the electronic message to the second application if the electronic message is present;
   evaluating the control field to determine a key associated with a receiver; and
   sending the electronic message by the second application to the receiver of the electronic message.

2. The method as claimed in claim 1, wherein before sending, the electronic message is encrypted with a key associated with the receiver.

3. A method for securely creating and sending an electronic message, comprising:
   executing a first application in a secure operating system to create the electronic message, the secure operating system being executed in a virtualization unit container;
   storing the electronic message on an internal storage which can only be accessed by the secure operating system and the virtualization unit;
   polling of the internal storage by a second application for the presence of the electronic message, the second application being executed by the virtualization unit;
   transmitting the electronic message to the second application if the electronic message is present; and
   sending the electronic message by the second application to a receiver of the electronic message,
   wherein before sending, the electronic message is encrypted with a key associated with the receiver,
   wherein
   a control field and a text field of the electronic message are stored separately from each other on the internal storage,
   the electronic message is polled by the second application solely for the presence of the control field, and
   the key associated with the receiver of the electronic message is determined by the second application using the control field.

4. A method for securely creating and processing an electronic message, comprising:
   executing a first application in a secure operating system to process the message, the secure operating system running in a virtualization unit container;
   polling of an external storage by a second application for the presence of the electronic message, the second application being executed by the virtualization unit;
   transmitting the electronic message, if present, from the external storage to an internal storage, which can only be accessed by the secure operating system and the virtualization unit, via the second application;

polling only a control field of the message of the internal storage by the first application for the presence of the electronic message;

evaluating the control field to determine a key associated with a receiver; and transmitting the electronic message from the internal storage to the first application via the first application for processing the electronic message if the electronic message is present on the internal storage.

5. The method as claimed in claim 4, wherein the external storage is polled by the second application for the presence of an encrypted electronic message, the encrypted electronic message is decrypted into the electronic message by the second application, and the electronic message is transmitted to the internal storage.

6. The method as claimed in claim 5, wherein the electronic message is stored on the internal storage without buffering on the external storage.

7. A transmitting device for securely creating and sending an electronic message, in particular for carrying out the method of claim 1, the transmitting device comprises:

a unit which is capable of executing a first application for creating the message and for storing the electronic message on an internal storage and a second application for polling the internal storage for the presence of the electronic message, for transmitting the electronic message to the second application if the electronic message is present, and for sending the electronic message to a receiver of the electronic message;

a virtualization unit, it being possible to execute the first application in a secure operating system and the secure operating system in a virtualization unit container and the second application via the virtualization unit; and the internal storage which can only be accessed by the secure operating system and the virtualization unit.

8. A receiving device for securely receiving and processing an electronic message, in particular for carrying out the method of claim 4, the receiving device comprises:

a unit which is capable of executing a first application for processing the message, for polling an internal storage for the presence of the electronic message, and for transmitting the electronic message from the internal storage to the first application for processing the electronic message if the electronic message is present on the internal storage, and a second application for polling an external storage for the presence of the electronic message and for transmitting the electronic message, if present, from the external storage to the internal storage via the second application;

a virtualization unit, it being possible to execute the first application in a secure operating system and the secure operating system in a virtualization unit container and the second application via the virtualization unit;

the internal storage which can only be accessed by the secure operating system and the virtualization unit; and the external storage which receives at least one message to be delivered to the first application.

\* \* \* \* \*